United States Patent [19]

Ewen

[11] Patent Number: 5,066,738
[45] Date of Patent: Nov. 19, 1991

[54] POLYMERIZATION OF OLEFINS WITH AN IMPROVED CATALYST SYSTEM USING A NEW ELECTRON DONOR

[75] Inventor: John A. Ewen, Houston, Tex.
[73] Assignee: Fina Technology, Inc., Dallas, Tex.
[21] Appl. No.: 512,283
[22] Filed: Apr. 20, 1990

Related U.S. Application Data

[60] Division of Ser. No. 282,985, Dec. 2, 1988, Pat. No. 4,927,797, which is a continuation-in-part of Ser. No. 36,080, Apr. 9, 1987, abandoned.

[51] Int. Cl.$^5$ ............................................. C08F 4/649
[52] U.S. Cl. .................................... 526/124; 502/127; 526/351
[58] Field of Search ........................................ 526/124

[56] References Cited

U.S. PATENT DOCUMENTS 4,295,991 10/1981 Wristers ........................... 526/119 X
4,816,433 3/1989 Terano et al. ........................ 526/124

Primary Examiner—Patrick P. Garvin
Attorney, Agent, or Firm—Jim D. Wheelington; John K. Abokhair; M. Norwood Cheairs

[57] ABSTRACT

The present invention provides a catalyst system that exhibits unprecedented catalyst efficiencies and control of desired properties in the polymer product. The catalyst system includes a new generation titanium catalyst in combination with an electron donor described by the formula:

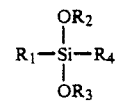

wherein $R_1$ is bulky, basic alkyl or cycloalkyl group containing at least one secondary or tertiary carbon atom; $R_2$ and $R_3$ are alkyl or aryl groups; and $R_4$ is an alkyl group with a primary carbon atom attached to the silicon atom. The system has a catalyst efficiency of at least about 30 kg/g-cat.2h as the Al/Si mole ratio varies from 20-200 in the system. The system easily achieves efficiencies over 60 kg/g-cat.2h. The system also exhibits good control over the xylene solubles, melt flow and molecular weight distribution of the polymer product.

10 Claims, No Drawings

POLYMERIZATION OF OLEFINS WITH AN IMPROVED CATALYST SYSTEM USING A NEW ELECTRON DONOR

This is a division of co-pending application Ser. No. 282,985, filed on Dec. 2, 1988 and now U.S. Pat. No. 4,927,797, which is a continuation of application Ser. No. 036,080, filed on Apr. 9, 1987 and now abandoned.

TECHNICAL FIELD

The present invention provides a catalyst system for the polymerization of olefins that includes the combination of a new generation titanium catalyst with an electron donor compound of the formula:

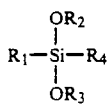

wherein $R_1$ is a bulky, basic alkyl or cycloalkyl group containing at least one secondary or tertiary carbon atom; $R_2$ and $R_3$ are alkyl or aryl groups; and $R_4$ is an alkyl group with a primary carbon atom attached to the silicon atom.

BACKGROUND

Catalyst systems for the polymerization of olefins are well known in the art. Typically, these systems include a Ziegler-Natta type polymerization catalyst; a co-catalyst, usually an organoaluminum compound; an electron donor compound; and an olefin monomer. Examples of such catalyst systems are shown in the following U.S. Pat. Nos. 4,107,413; 4,294,721; 4,439,540; 4,115,319; 4,220,554; 4,460,701; and 4,562,173; the disclosures of these patents are hereby incorporated by reference. These are just a few of the scores of issued patents relating to catalysts and catalyst systems designed primarily for the polymerization of propylene and ethylene.

Ziegler-Natta type polymerization catalysts are basically a complex derived from a halide of a transition metal, for example, titanium, chromium or vanadium with a metal hydride and/or a metal alkyl that is typically an organoaluminum compound. The catalyst is usually comprised of a titanium halide supported on a magnesium compound complexed with an alkylaluminum.

The development of these polymerization catalysts has proceeded seemingly in generations of catalysts. The catalysts disclosed in the patents reference above are considered by most to be third generation catalysts. With each new generation of catalysts, the catalyst properties have improved. Particularly, the efficiencies of the catalysts, as expressed in kilograms of polymer product per gram of catalyst in two hours, have increased from the 1-3 range to the 10-12 range and beyond. Catalysts have been developed that not only have higher efficiencies but also retain their activity over a longer period of time, thus being able to produce more polymer product over the life of the catalyst. Any increase in the efficiency and life of the catalyst leads to lower costs due to lower catalyst consumption, and it also lowers the capital expenditures in building and operating a plant as the size of the reactors are lowered for specific plant capacities and the reactor residence time is lowered. A higher efficiency also leads to a cleaner polymer product thereby avoiding the need to wash or treat the product to remove catalyst ash residuals.

In addition to the improved catalysts, improved activation methods have also led to increases in the catalyst efficiency. A most recent discovery includes a process for pre-polymerizing the catalyst just prior to introducing the catalyst into the reaction zone. This process is disclosed in a co-pending application, now issued U.S. Pat. No. 4,767,735 the disclosure of which is hereby incorporated by reference.

In addition to the development of new catalysts and new reaction processes, a discovery of a more appropriate co-catalyst or electron donor to go with the new generation of catalysts in forming a total catalyst system would be of great benefit to the polymerization art especially if it lead to dramatic increases in the efficiency of the catalyst system and to improved quality control of the polymer product. In such a total catalyst system, a co-catalyst activates the catalyst and provides the initiation of a polymer chain. The co-catalyst that works well with the new generation catalysts is an organoaluminum compound, most typically triethylaluminum (TEAl) or another trialkylaluminum. Examples of other useful organoaluminum compounds include an alkylaluminum dihalide, a trialkoxyaluminum, a dialkylaluminum halide, and a triisobutylaluminum.

An electron donor compound is used in the polymerization reaction to reduce the atactic form of the polymer thereby giving control of and increasing the production of isotactic polymers. Although a broad range of compounds are known generally as electron donors, a particular catalyst may have a specific compound or group of compounds with which it is especially compatible. Discovery of an appropriate type of electron donor can lead to significant increases in catalyst efficiency as well as to improved control of the isotactic index of the desired polymer product and other properties of the product such as molecular weight distribution and melt flow. Discovery of a specific group of electron donors for a particular type of catalyst that would provide these results would be highly advantageous.

The present invention comprises such a discovery. It has been surprisingly discovered that a specific group of silane compounds serving as electron donors in combination with a particular type of catalyst results in significant increases in catalyst efficiency over the previously known efficiencies for this particular type of catalyst as well as other known catalyst systems. In addition, the combination results in a system with better control of the isotactic index, molecular weight distribution and melt flow of the polymer product than provided with catalyst systems known prior to this invention.

SUMMARY OF THE INVENTION

The present invention provides a system for the polymerization of olefins wherein the system includes the combination of a particular type of catalyst with a specific group of electron donor compounds which results in significant increases in the efficiency of the catalyst and improved control of the properties of the polymer product. The catalyst is a new generation catalyst comprising a complex of a dialkoxy magnesium and a titanium halide. The novel electron donor is selected from a silane compound of the following formula:

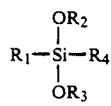

wherein $R_1$ is a bulky, basic alkyl or cycloalkyl group containing at least one secondary or tertiary carbon atom; $R_2$ and $R_3$ are alkyl or aryl groups; and $R_4$ is an alkyl group with a primary carbon atom attached to the silicon atom. In a preferred embodiment, $R_1$ is a cyclohexyl or t-butyl group; $R_2$ and $R_3$ are methyl, ethyl, propyl, or butyl groups and not necessarily the same; and $R_4$ is a group consisting of 1-6 carbon atoms. A preferred electron donor is methylcyclohexyldimethoxysilane (MCMS). In addition, the system may contain an organoaluminum compound which acts as a co-catalyst. A preferred co-catalyst is a trialkylaluminum, most preferably triethylaluminum (TEAl).

The invention also provides a catalyst system as described above, wherein the system is capable of polymerizing an olefin monomer with a catalyst efficiency of about 60 kilograms of polymer product per gram of catalyst in two hours. Particular catalyst systems included in the invention may show somewhat lower efficiencies. Further, the catalyst system may be characterized by an efficiency of at least 30 kg/g-cat.2 h while the Al/Si ratio as defined by the mole ratio of the organoaluminum compound and the silane electron donor varies within the range 20-200. Additionally, the catalyst system may be further characterized by an efficiency greater than 30 while producing a polymer product with melt flow values within the range 0.1-4 g/10 min.

The catalyst system may be further characterized by having an isotactic capacity such that the system produces a polymer product in which the xylene soluble atactic form may be kept within the range of 2-10 wt % of the product while the Al/Si mole ratio varies up to 200. The system may be further characterized by an ability to accurately control the molecular weight distribution (MWD) of the product within the range 4-12 at any particular melt flow index of the product within the range 1-50 g/10 min.

The invention also provides a process for the polymerization of olefins. The process comprises: contacting the new generation polymerization catalyst with an organoaluminum compound, preferably with a trialkylaluminum; contacting the catalyst with an electron donor either simultaneously with or after contact with the organoaluminum, the electron donor being a silane compound as described by the formula above; prepolymerizing the catalyst by contacting a small amount of monomer with the catalyst; and introducing the catalyst into a polymerization reaction zone containing the organoaluminum compound, the electron donor and the monomer. The process further comprises withdrawing a polymer product in which the xylene solubles are within the range of 2-10 wt %, while the Al/Si ratio in the reaction zone is within the range 1-200.

DETAILED DESCRIPTION

The present invention relates to the combination of a particular group of compounds as electron donors with a particular type of catalyst for use in the polymerization of propylene. This combination results in a catalyst system that has a catalyst efficiency significantly higher than provided by previous catalyst systems as illustrated by the comparative examples included below. Further, the catalyst system of the present invention retains most of its high activity over time relative to other catalyst systems. The catalyst system also provides better control of the xylene solubles and of the molecular weight distribution of the polymer product than with other electron donors and the particular type of catalyst. The melt flow of the product is more stable with the catalyst systems of the present invention than with systems known previously in the art. These and other beneficial advantages will become more apparent from the following detailed description of the invention and the accompanying examples.

Electron donors are typically used in two ways in the formation of a Ziegler-Natta catalyst and a catalyst system. First, an internal electron donor may be used in the formation reaction of the catalyst as the transition metal halide is reacted with the metal hydride or metal alkyl. Examples of internal electron donors include: amines, amides, ethers, esters, aromatic esters, ketones, nitriles, phosphines, stibines, arsines, phosphoramides, thioethers, thioesters, aldehydes, alcoholates, and salts of organic acids. The second use for an electron donor in a catalyst system is as an external electron donor and stereoregulator in the polymerization reaction. The same compound may be used in both instances, although typically they are different. A common external electron donor is an organic silicon compound, for example, diphenyldimethoxysilane ("DPMS"). A description of the two types of electron donors is provided in U.S. Pat. No. 4,535,068, the disclosure of which is hereby incorporated by reference.

As the present invention relates particularly to external electron donors, the term "electron donor" as used herein, refers to the external donor. The external electron donor acts as a stereoregulator to control the amount of atactic form of polymer produced. It may also increase the production of isotactic polymers. Organic silicon compounds are known in the art for use as electron donors. Examples of electron donors that are organic silicon compounds are disclosed in U.S. Pat. Nos. 4,218,339; 4,395,360; 4,328,122; and 4,473,660. As mentioned, a particular catalyst may produce better results when paired with a particular group of electron donors. Examples of this pairing of catalyst and electron donors are disclosed in U.S. Pat. Nos. 4,562,173 and 4,547,552.

The effectiveness of the electron donor depends largely on its compatibility with the catalyst with which it is used. Apparently, there is some electrical and/or steric compatibility between certain donors and particular catalysts that yields better results than with the same catalyst and less compatible donors. This compatibility is not totally understood, nor is it predictable as there are no outward suggestions that one electron donor would work better than another with a particular catalyst. As demonstrated by the present invention, however, it may be discovered that a certain group of electron donors is more compatible with a particular type of catalyst than other electron donors.

It has been discovered that a particular group of electron donors does significantly enhance the catalytic properties of a specific type of catalyst. The catalyst involved in the present invention is a new generation, Ziegler-type titanium catalyst for the polymerization of olefins. The catalyst comprises a solid catalyst component obtained by (i) suspending a dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

Preferred aromatic hydrocarbons useful in the formation of the catalyst include benzene, xylene, ethylbenzene, propylbenzene and trimethylbenzene. A diester of phthalic acid is preferably used as the diester of the aromatic dicarboxylic acid. Examples include dimethyl phthalate, diethyl phthalate, dipropyl phthalate, diisopropyl phthalate, dibutyl phthalate, diisobutyl phthalate, diamyl phthalate, diisoamyl phthalate, methylbutyl phthalate, ethylbutyl phthalate, ethylisobutyl phthalate and ethylpropyl phthalate. Suitable titanium halides include $TiCl_4$, $TiBr_4$ and $TiI_4$, with $TiCl_4$ being preferred.

The ratios of the respective components are not critical but can vary to tailor the performance of the catalyst. However, in general, the diester of the aromatic dicarboxylic acid is used in an amount of 0.01 to 2 g, preferably 0.1 to 1 g, per gram of the dialkoxy magnesium, and the titanium halide is used in an amount of at least 0.1 g, preferably at least 1 gram, per gram of the alkoxy magnesium. The amount of the aromatic hydrocarbon which is liquid at normal temperature should be sufficient to form a suspension.

Suspension of the dialkoxy magnesium into the aromatic hydrocarbon is performed at a temperature of from room temperature to the boiling point of the aromatic hydrocarbon used for up to 100 hours, preferably up to 10 hours. It is important that the formed suspension should not be a homogeneous solution. The contact of the suspension with the titanium halide and the contact of the composition obtained by said contact with the titanium halide are carried out at a temperature of from $-20°$ C. to the boiling point of the titanium halide used, preferably 50° to 120° C., for 10 minutes to 10 hours. The means for contacting the components is not particularly critical, so far as sufficient contact is attained among the respective components. Preferably, the contact is carried out by using a vessel provided with a stirrer.

The above-described catalyst exhibits some increase in efficiency over previously known catalysts when it is paired with a previously used electron donor, but that increase is significantly greater when the catalyst is paired with electron donors as described by the present invention. This improved efficiency is accompanied by better operational control of the properties of the polymer product such as the xylene solubles, molecular weight distribution and melt flow.

The electron donors included in the present invention are organic silicon compounds such as those described by the following formula:

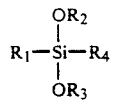

wherein $R_1$ is a bulky, basic alkyl or cycloalkyl group containing at least one secondary or tertiary carbon atom; $R_2$ and $R_3$ are alkyl or aryl groups; and $R_4$ is an alkyl group with a primary carbon atom attached to the silicon atom.

In preferred embodiments of the invention, $R_1$ is a cyclohexyl or t-butyl group, $R_2$ and $R_3$ are methyl, ethyl or propyl groups, and $R_4$ is a group containing 1–6 carbon atoms. A most preferred electron donor is methylcyclohexyldimethoxysilane ("MCMS"). The use of MCMS with other types of catalysts does not yield the dramatic results obtained by using MCMS with the catalyst described herein. The combination of MCMS and the particular type of catalyst yields wholly unexpected results that surpass previously known catalyst systems. The electron donors as described by the present invention may be limited by the stability of the compound and the ease of handling including storage, transportation and use in the plant.

The most significant unexpected result obtained from the combination of the above-describe catalyst and MCMS ("MCMS system") is the dramatic increase in the efficiency of the catalyst system as measured in kilograms of polymer product per gram of catalyst in two hours (kg/g-cat.2 h). The catalyst system, which includes an organo-aluminum compound, has been shown to achieve efficiencies higher than 60 kg/g/cat.2 h, and the efficiency can be at least 30 kg/g-cat.2 h for Al/Si mole ratios within the range 20–200. The optimum Al/Si ratio in order to achieve the highest efficiency is within the range 40–90. It is expected that efficiencies higher than 30 may be obtainable for specific systems described by the present invention at Al/Si ratios less than 20 and greater than 200.

Catalyst systems described by the present invention also exhibit a high efficiency while producing a polymer product having a low melt flow index. It is achievable, to have catalyst systems that have efficiencies greater than 30 kg/g-cat.2 h with melt flow values within the range 0.1–4.

Further, the catalyst system is capable of achieving these high efficiencies over a wide range of Al/Si ratios (1–200) while exhibiting an isotactic capacity in controlling the formation of atactic polymer, or xylene solubles, at relatively low levels. When catalyst desired herein is paired with another donor such as DPMS, the system exhibits an exponential increase in the xylene solubles as the Al/Si ratio approaches 40. The present catalyst system using MCMS, however, exhibits a gradual linear increase in the wt % of xylene solubles from about 2 to about 6% as the Al/Si ratio increases from 1 to 200 and above. This linear relationship, as opposed to an exponential increase, has dramatic operational consequences. With a linear relationship, a change in the Al/Si ratio of 10–20 results in only a small change in the xylene solubles (approximately 0.3–0.5%). This allows for small fluctuations in the operation of the reactor, such as when new feed is input or operational errors occur, while still controlling the wt % of xylene solubles in the polymer product within a desired range. It also results in less off-grade material during transition from one grade of product to another. The exponential increase exhibited by the DPMS system, on the other hand, leads to substantial changes in the percentage of xylene solubles with any fluctuation in the Al/Si mole ratio and the production of considerable off-grade material when switching from one grade to another.

The MCMS system also provides better control of the molecular weight distribution ("MWD") in the polymer product. The MWD, defined as $M_w/M_n$ as known in the art can be accurately controlled while varying the Al/Si ratio. The MWD may be tailored to a selected value within the range 4-12 for any particular melt flow within the range 1-50 g/10 min. This ability to control the MWD has similar operational advantages to those described above: less deviation from the desired value as the system fluctuates and easier transition from one selected MWD to another.

In a polymerization reaction, hydrogen is fed into the polymerization reactor along with the olefin monomer. The introduction of hydrogen into the system acts to terminate the chain formation of the polymer thereby controlling the molecular weight of the polymer and the melt flow index of the polymer product. The MCMS system provides better control of the melt flow of the polymer product as a function of the mole percentage of hydrogen in the feed. The curve is a gentler curve than that demonstrated by the DPMS system, and it does not go through a maximum or operate somewhat erratically as does melt flow response in the DPMS system. Again, this allows for more error or fluctuation in the hydrogen feed. Such fluctuation would normally occur during start-up of the system or during a change from one grade of product to another.

The MCMS catalyst system exhibits a catalyst efficiency that is nearly linear with respect to mole percent of hydrogen in the feed. In the DPMS system, the catalyst efficiencies go through a sharp maximum at about 8 melt flow index, level out and then drop off. The linear relationship of the MCMS system provides a more predictable result and guards against run-away reactions.

The MCMS catalyst system also exhibits remarkable stability in retaining its high level of activity over time. In comparing the efficiency of the catalyst over two hours with the efficiency of the catalyst over one hour, the ratio may exceed 1.7. A ratio of 2 would represent an ideal catalyst that lost none of its activity over time. Measurements of the catalyst with another electron donor showed a ratio of only about 1.5. Another commercially available polymerization catalyst exhibited a ratio of 1.53 with DPMS as the electron donor.

The advantages of the high stability of the MCMS system are tremendous. The most obvious advantage would be a substantial cost savings as the catalyst would have a longer life and less catalyst would be required. A second advantage would be a significant savings in capital investment in the sizing of any series type reactors. Since the catalyst would retain its high activity, the residence time in the reactors would be lessened and the second or third reactors in a series could be made smaller. This would be particularly applicable to the production of co-polymers. A third advantage of the high stability would be a nearly ideal catalyst for producing high impact or "block" co-polymers. A catalyst that loses only a small fraction of its activity after a second or third hour would produce a better uniformity of co-polymers as essentially the same activation sites which produced the first polymer would still be active to produce the second polymer. A fourth advantage is that a highly active and stable system produces a cleaner polymer as there is more polymer produced for the same amount of catalyst ash and therefore resulting in a lower percentage of ash content in the polymer. The co-polymer product would be less corrosive, exhibit less color and be more applicable for use in electrical systems.

The present invention also provides a process for the polymerization of olefins using the catalyst and the electron donors described by the above formula. Although the catalyst system may be used in almost any commercially known polymerization process, the preferred process of the present invention includes a pre-polymerization of the catalyst with a small amount of monomer as described in U.S. Pat. No. 4,767,735, incorporated by reference above. As provided in that disclosure, a carrier stream for the catalyst is provided, the catalyst is contacted with the co-catalyst or organoaluminum compound, the catalyst is contacted with the electron donor, the catalyst stream is contacted with a relatively small amount of the total amount of monomer to be polymerized, the catalyst stream passes through a tubular reactor, and the pre-polymerized catalyst and catalyst stream are introduced into the polymerization reaction zone. The electron donor may be contacted with the catalyst simultaneously with the co-catalyst. A polymer product may then be withdrawn from the reactor. In using the described catalyst with the electron donors described by the formula above, the catalyst may have an efficiency of at least about 30 kg/g-cat.2 h while the Al/Si mole ratio in the reaction is within the range 20-200. The polymer product may also be characterized by xylene solubles within the range 2-10 wt %.

The following Examples and Comparative Examples illustrate the present invention and its various advantages in more detail. The results are summarized in Tables 1-5.

PREPARATION OF THE CATALYST

A round-bottom flask having a capacity of 200 ml and provided with a stirrer, the inner atmosphere of which was sufficiently substituted with nitrogen gas, was charged with 10 g of diethoxy magnesium and 80 ml of toluene, to form a suspension. Next, 20 ml of $TiCl_4$ were added to the suspension and the temperature was elevated to 90° C.; 27 ml of n-butyl phthalate were added and the temperature was further elevated to 115° C. The reaction was carried out with stirring for 2 hours. After the reaction, the composition was washed twice with 100 ml of toluene maintained at 90° C.; 20 ml of $TiCl_4$ and 80 ml of toluene were further added to the composition and reaction was carried out with stirring at 115° C. for 2 hours. After the reaction, the composition was washed 10 times with 200 ml of n-heptane maintained at 40° C. to obtain a catalyst component. The catalyst component was subjected to solid-liquid separation and the titanium content in the solid was measured to be about 2.61% by weight.

EXAMPLE 1

The procedures followed in the Examples are essentially those described in U.S. Pat. No. 4,767,735 as tubular pre-polymerization. A catalyst system was established using the catalyst prepared above, triethylaluminum ("TEAl") as a co-catalyst, and methylcyclohexyldimethoxysilane ("MCMS") as an electron donor. A two liter reaction vessel was stabilized at 30° C. One-half of the total amount of TEAl and MCMS used in the polymerization were added to the reactor which was followed by the addition of 15.6 mmoles of hydrogen and most of the propylene to be used in the polymerization. In this Example, the total amounts used were 2 mmoles of TEAl, and 0.4 mmoles of MCMS, so 1 mmole of TEAl and 0.2 mmoles of MCMS were added to the reaction vessel. The other one-half of the total TEAl and MCMS were added to a 40 cc tubular reaction cylinder. The amount of propylene added to the reaction vessel was about 1.2 liters. The temperature of the 2 liter reaction vessel was raised to 70° C. A small amount of the catalyst (approximately 4 mg) was added to the 40 cc reaction cylinder and the catalyst was allowed to pre-contact with the TEAl and MCMS for 5 minutes. The cylinder was then filled with about 35 cc of propylene which was allowed to prepolymerize for about 5 seconds before being flushed into the 2 liter reaction vessel with about 165 cc of propylene at 70° C. The polymerization reaction in the 2 liter vessel proceeded for 2 hours at which point it was stopped and the polymer product was withdrawn, collected, dried and analyzed. The efficiency of the catalyst was calculated by dividing the polymer yield by the exact amount of catalyst used in the polymerization. This was determined by knowing the weight percentage of Mg reported in the catalyst and by measuring the ppm Mg in the polymer product using atomic absorption. The efficiency is reported in kilograms of polymer product per gram of catalyst in two hours. The Al/Si mole ratio was calculated from the amount of TEAl used divided by the amount of MCMS. The xylene solubles were measured by dissolving the polymer in hot xylene, cooling the solution to 0° C. and precipitating out the isotactic form. The xylene solubles are the wt % of the polymer that was soluble in the cold xylene. The melt flow indeces were determined using the standard ASTM Method D 1238-82 for polypropylene and is reported in gms/10 min. In addition, the bulk density and the molecular weight distribution (MWD) of the polymer product were measured and calculated using standard techniques. The MWD is shown as $M_w/M_n$ which are known in the art.

EXAMPLES 2-9

The procedures of Example 1 were repeated except that the total amount of MCMS was varied as indicated in Table 1 from 0.2 mmoles to 0.01 mmoles. This varied the Al/Si ratio from 10 to 200 and illustrates the effect of the Al/Si ratio on the efficiency and on the xylene solubles. The results are tabulated in Table 1.

As shown in Table 1, the efficiency is greater than 50 kg/g-cat.2h for Al/Si ratios within the range 20-200, and it increases as the Al/Si ratio increases from 5-60 reaching a maximum at some point between 40-90 Al/Si. The MCMS system is capable of easily achieving efficiencies greater than 60 kg/g-cat.2h. Also, as seen from the results shown in Table 1, the xylene solubles are controlled within a narrow range as the Al/Si ratio varies from 5-200. The relationship is nearly linear with a small, gradual slope. Similarly, the MWD is also controlled within a narrow range as the Al/Si ratio varies from 5-200 and the melt flow index (MI) ranges from 1-10.4. As discussed, these relationships of the properties of the polymer and the Al/Si ratio are very advantageous in allowing some fluctuations in the operation of the reactor and/or some errors without significantly changing the properties of the product. It also allows particular specifications for a product to be achieved more easily with a broader range of reactor parameters.

COMPARATIVE EXAMPLES 10-14

The procedures of Example 1 were repeated except that DPMS was substituted for MCMS as the electron donor. More catalyst was used (approximately 10 mg) in these runs. Also, the total amount of propylene used deviated from 1.4 liters in Example 10 (1.53 liters), Example 11 (1.47 liters) and Example 14 (1.54 liters). The results are shown in Table 2.

COMPARATIVE EXAMPLES 15-17

These comparative examples were plant trial runs using the DPMS system. The polymerization reaction took place in a 4700 gallon reactor, and the amounts of TEAl, DPMS, catalyst and propylene were upscaled accordingly from those given in Comparative Examples 10-14. The TEAl, DPMS and catalyst were continuously fed into the reactor. The pre-contact of the catalyst with the TEAl and DMPS took place in a carrier stream for the catalyst as described in U.S. Pat. No. 4,767,735. A portion of the total propylene used in the reaction was pre-polymerized in the carrier stream prior to the stream entering the reactor. The polymer product was withdrawn from the reactor and analyzed. The results are shown in Table 2.

Comparing the Examples 10-17 using DPMS as the electron donor with Examples 1-9, it is seen that the MCMS system has superior performance in terms of efficiency over a broad range of Al/Si ratios. The MCMS system also exhibits lower values and better control of the xylene solubles at particular Al/Si ratios. As indicated, the xylene solubles increase exponentially as the Al/Si ratio approaches 40 in the DPMS system. The MCMS system exhibits only a gradual increase in the xylene solubles as the Al/Si ratio exceeds 40. Also, the values for the melt flow index do not change as radically in the MCMS system as they do in the DPMS system as the Al/Si ratio is varied.

COMPARATIVE EXAMPLES 18-24

These examples compare the performance of the MCMS system with another catalyst using MCMS as the electron donor. The catalyst is designated as Catalyst "B" and is a commercially used Ziegler-type polymerization catalyst available from a different supplier. The procedures of Example 1 were repeated with substitution of Catalyst B for the catalyst disclosed herein. The amount of catalyst used was approximately 6 mg except in Example 23 in which 3 mg were used. The amounts of TEAl and MCMS used are as indicated. The results are shown in Table 3.

In comparing the results shown in Table 3 with those in Table 1, the catalyst efficiencies in Table 1 are nearly twice or more the efficiencies for Catalyst B as shown in Table 3. The melt flow index values are also considerably higher for Catalyst B.

EXAMPLES 25-30

These examples show the effect of hydrogen on the melt flow index and the molecular weight distribution of the polymer product in the MCMS system. The procedures of Example 1 were repeated except that approximately 10 mg of catalyst were used, except for Examples 29 and 30 which used 5 mg. The Al/Si ratio was held constant at 50 for these examples as 2 mmol of TEAl and 0.04 mmol of MCMS were used. The polymerization reaction was run for only 1 hour before it was stopped and the product withdrawn. The results are shown in Table 4.

COMPARATIVE EXAMPLES 31-36

These examples compare the effect of hydrogen on the melt flow index using the DPMS system. The procedures of Example 1 were repeated except that the amount of the catalyst used was approximately 4 mg.

The Al/Si ratio was held constant at 5 by using 2 mmoles of TEAl and 0.4 mmoles of DPMS. The reaction was run for 2 hours. The results are shown in Table 5.

Comparing the results shown in Tables 4 and 5, the increase in the melt flow index with the addition of hydrogen is more gradual and the values are much lower for the MCMS system than with the DPMS system. This has significant operational consequences as hydrogen is added to the system, a change is made in the desired product, or during initial start-up of the system. Any fluctuation in the amount of hydrogen produces less change in the melt flow index in the MCMS system. This leads to less off-grade material and allows more error in the operation of the system.

Comparing the efficiency results for the MCMS systems from Tables 1 and 4 shows that the ratio of the catalyst efficiency in 2 hours to the catalyst efficiency in 1 hour may be greater than 1.7. Measurements of the catalyst with another electron donor results in a ratio of about 1.5. Catalyst B with DPMS also shows a ratio of about 1.53. The advantages of this stability in the MCMS system are explained above.

COMPARATIVE EXAMPLES 37–42

These examples compare the results of a Catalyst B and DPMS system with those of a Catalyst B-MCMS system to show that MCMS did not perform significantly different from DPMS when used with Catalyst B. The results also show another example of the level of efficiencies available in the art prior to the present invention. The procedures of Example 1 were repeated except for the amounts of Catalyst B and DPMS used in the procedures were as indicated in Table 6. The results show that DPMS and MCMS performed essentially the same when used with Catalyst B and did not exhibit the exceptional properties of the present invention.

Having described a few specific embodiments of the present invention, it will be understood by those skilled in the art that modifications may be made without departing from the scope of the present invention.

TABLE 1

MCMS System

| Example | TEAl mmol | MCMS mmol | Al/Si | Mg ppm | Catalyst mg | Yield g | Efficiency Kg/g-cat.2h | Bulk Density | Melt Flow g/10 min | Xylene Solubles wt % | MWD |
|---|---|---|---|---|---|---|---|---|---|---|---|
| 1 | 2 | 0.4 | 5 | 5.97 | 4.18 | 135 | 32.7 | 0.49 | 2.2 | 2.5 | 5.3 |
| 2 | 2 | 0.2 | 10 | 5.10 | 3.94 | 171 | 38.2 | 0.49 | 1.8 | 2.1 | |
| 3 | 2 | 0.1 | 20 | 3.46 | 3.94 | 216 | 56.4 | 0.50 | 5.2 | 2.3 | 5.3 |
| 4 | 2 | 0.05 | 40 | 3.15 | 3.95 | 228 | 61.9 | 0.49 | 6.1 | 2.6 | 5.7 |
| 5 | 2 | 0.033 | 60 | 2.63 | 3.95 | 255 | 74.1 | 0.49 | 6.8 | 3.0 | |
| 6 | 2 | 0.022 | 90 | 2.70 | 3.98 | 293 | 72.2 | 0.45 | 7.0 | 3.5 | 5.7 |
| 7 | 2 | 0.016 | 120 | 2.71 | 3.98 | 264 | 72.0 | 0.45 | 9.7 | 5.4 | |
| 8 | 2 | 0.0125 | 160 | 2.75 | 3.98 | 340 | 70.9 | 0.40 | 10.4 | 6.4 | 7.1 |
| 9 | 2 | 0.01 | 200 | 3.05 | 4.05 | 258 | 63.9 | 0.42 | 9.3 | 6.2 | |

TABLE 2

DPMS System

| Comparative Example | TEAl mmol | DPMS mmol | Al/Si | Mg ppm | Catalyst mg | Yield g | Efficiency Kg/g-cat.2h | Bulk Density | Melt Flow g/10 min | Xylene Solubles wt % |
|---|---|---|---|---|---|---|---|---|---|---|
| 10 | 2.0 | 0.4 | 5 | 5.25 | 10 | 311 | 37.1 | 0.53 | 7 | 1.8 |
| 11 | 2.0 | 0.05 | 40 | 5.01 | 10 | 278 | 38.9 | 0.48 | 14 | 4.2 |
| 12 | 2.0 | 0.05 | 40 | 3.27 | 10 | 492 | 59.6 | 0.55 | | 5.5 |
| 13 | 2.0 | 0.04 | 50 | 3.60 | 10 | 421 | 54.2 | 0.35 | 12 | 7.8 |
| 14 | 2.0 | 0.033 | 60 | 4.85 | 10 | 434 | 40.2 | 0.22 | 40 | 23.0 |
| Plant Trials | | | | | | | | | | |
| 15 | | | 5 | 5.42 | | | 36.0 | | 12 | 1.6 |
| 16 | | | 10 | 4.46 | | | 43.7 | | 13 | 1.8 |
| 17 | | | 30 | 4.86 | | | 40.1 | | 13 | 2.4 |

TABLE 3

Catalyst B - MCMS

| Comparative Example | TEAl mmol | MCMS mmol | Al/Si | Mg ppm | Catalyst mg | Yield g | Efficiency Kg/g-cat.2h | Bulk Density | Melt Flow g/10 min | Xylene Solubles wt % |
|---|---|---|---|---|---|---|---|---|---|---|
| 18 | 2 | 0.2 | 10 | 6.3 | 5.95 | 154 | 25.4 | 0.47 | 5 | 2.1 |
| 19 | 2 | 0.1 | 20 | 5.9 | 5.95 | 137 | 27.3 | 0.46 | 6 | 2.3 |
| 20 | 2 | 0.04 | 50 | 5.9 | 5.95 | 155 | 27.2 | 0.45 | 4 | 3.1 |
| 21 | 4 | 0.025 | 160 | 5.3 | 5.99 | 157 | 30.2 | 0.40 | 16 | 7.0 |
| 22 | 2 | 0.0125 | 160 | 5.1 | 5.99 | 186 | 31.2 | 0.40 | 19 | 9.6 |
| 23 | 2 | 0.01 | 200 | 7.0 | 2.99 | 84 | 22.8 | 0.30 | 26 | 10.8 |
| 24 | 4 | 0.02 | 200 | 5.0 | 5.99 | 209 | 31.8 | 0.40 | 15 | 7.9 |

TABLE 4
MCMS System

| Example | Al/Si | H2 mmol | Time h | Mg ppm | Yield g | Efficiency Kg/g-cat.2h | Bulk Density | Melt Flow g/10 min | Xylene Solubles wt % | MWD |
|---|---|---|---|---|---|---|---|---|---|---|
| 25 | 50 | 1.56 | 1 | 6.46 | 290 | 30.2 | 0.48 | 1.1 | 2.7 | 6.1 |
| 26 | 50 | 7.80 | 1 | 5.35 | 340 | 36.4 | 0.50 | 3.2 | 2.6 | 6.2 |
| 27 | 50 | 31.20 | 1 | 4.55 | 456 | 42.9 | 0.51 | 11.4 | 2.6 | 5.6 |
| 28 | 50 | 62.40 | 1 | 4.33 | 505 | 45.0 | 0.47 | 33.4 | 5.0 | 6.1 |
| 29 | 50 | 62.4 | 1 | 5.32 | 202 | 36.7 | 0.48 | 30.0 | 3.3 | 5.8 |
| 30 | 50 | 62.4 | 1 | 4.13 | 244 | 47.2 | 0.49 | 30.4 | 3.2 | |

TABLE 5
DPMS System

| Comparative Example | Al/Si | H2 mmol | Time h | Mg ppm | Yield g | Efficiency Kg/g-cat.2h | Bulk Density | Melt Flow g/10 min | Xylene Solubles wt % |
|---|---|---|---|---|---|---|---|---|---|
| 31 | 5 | 3.1 | 2 | 5.7 | 107 | 34.2 | 0.51 | 3.0 | 3.0 |
| 32 | 5 | 6.4 | 2 | 5.32 | 114 | 36.7 | 0.49 | 7.0 | 3.4 |
| 33 | 5 | 15.6 | 2 | 4.08 | 156 | 47.8 | 0.50 | 8.0 | 3.2 |
| 34 | 5 | 31.2 | 2 | 4.41 | 143 | 44.2 | 0.50 | 19.0 | 3.5 |
| 35 | 5 | 62.4 | 2 | 4.36 | 149 | 44.7 | 0.49 | 47.0 | 4.0 |
| 36 | 5 | 124.8 | 2 | 5.17 | 141 | 37.7 | 0.47 | 149.0 | 3.7 |

TABLE 6
Catalyst B - DMPS

| Comparative Example | TEAl mmol | DPMS mmol | Al/Si | Catalyst mg | Mg ppm | Yield g | Efficiency Kg/g-cat.2h | Bulk Density g/cc | Melt Flow g/10 min | Xylene Solubles wt % |
|---|---|---|---|---|---|---|---|---|---|---|
| 37 | 2.0 | 0.4 | 5 | 6 | 6.0 | 144 | 27 | 0.48 | 8 | 3.1 |
| 38 | 2.0 | 0.2 | 10 | 6 | 6.2 | 156 | 26 | 0.48 | 7 | 3.2 |
| 39 | 2.0 | 0.1 | 20 | 6 | 6.1 | 149 | 26 | 0.48 | 7 | 3.7 |
| 40 | 2.0 | 0.05 | 40 | 6 | 6.2 | 148 | 26 | 0.46 | 7 | 4.7 |
| 41 | 2.0 | 0.04 | 50 | 6 | 6.4 | 158 | 25 | 0.46 | 6 | 4.9 |
| 42 | 2.0 | 0.033 | 60 | 6 | 7.3 | 148 | 22 | | 7 | |

I claim:

1. A process for the polymerization of olefins, comprising:
   (a) preparing a solid catalyst component by: (i) suspending a dialkoxy magnesium in an aromatic hydrocarbon that is liquid at normal temperatures, (ii) contacting the dialkoxy magnesium with a titanium halide and further contacting the resulting composition a second time with the titanium halide, and (iii) contacting the dialkoxy magnesium with a diester of an aromatic dicarboxylic acid at some point during the treatment with the titanium halide in (ii);
   (b) contacting the catalyst component with an organoaluminum compound;
   (c) contacting said catalyst component with an electron donor either simultaneously with or after step (b) to form a catalyst system, said electron donor being described by the formula:

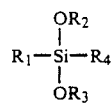

wherein $R_1$ is a bulky, alkyl or cycloalkyl group containing at least one secondary or tertiary carbon atom; $R_2$ and $R_3$ are each independently an alkyl or aryl group; and $R_4$ is an alkyl group with a primary carbon atom attached to the silicon atom;

(d) introducing said catalyst system into a polymerization reaction zone containing an olefin monomer; and
   (e) polymerizing said monomer.

2. The process of claim 1 wherein said organoaluminum compound is triethylaluminum.

3. The process of claim 1 wherein $R_1$ is a cyclohexyl or t-butyl group.

4. The process of claim 1 wherein said monomer is propylene.

5. The process of claim 1 wherein said electron donor is methylcyclohexyldimethoxysilane.

6. The process of claim 1 wherein said process is characterized by a catalyst efficiency of at least about 30 kg of polymer product per gram of catalyst in two hours with the mole ratio of Al/Si from the organoaluminum compound and the silicon electron donor within the range of 20–200.

7. The process of claim 1 wherein said process is characterized by producing a polymer product in which the xylene soluble portion is within the range of 2–10 wt % of the polymer product.

8. The process of claim 1 further comprising the addition of a second monomer so as to form a copolymer.

9. The process of claim 1 further comprising:
   between steps (c) and (d), pre-polymerizing said catalyst system by contacting a small amount of said monomer with said catalyst system.

10. The process of claim 1 further comprising:
    step (d) modified by introducing said catalyst system into a polymerization reaction zone containing additional amounts of said organoaluminum compound, said electron donor and an olefin monomer.

* * * * *

UNITED STATES PATENT AND TRADEMARK OFFICE
CERTIFICATE OF CORRECTION

PATENT NO. : 5,066,738

DATED : November 19, 1991

INVENTOR(S) : John A. Ewen

It is certified that error appears in the above-identified patent and that said Letters Patent is hereby corrected as shown below:

On the title page, item [60]:

In referring to Related U.S. Application Data, change "Division of Ser. No. 282,985, Dec. 2, 1988, Pat. No. 4,927,797, which is a continuation-in-part of Ser. No. 36,080, Apr. 9, 1987, abandoned" to --Division of Ser. No. 282,985, Dec. 2, 1988, Pat. No. 4,927,797, which is a continuation of Ser. No. 36,080, Apr. 9, 1987, abandoned.--

Signed and Sealed this

Twelfth Day of October, 1993

Attest:

BRUCE LEHMAN

Attesting Officer

Commissioner of Patents and Trademarks